(12) United States Patent
Kaifu et al.

(10) Patent No.: US 7,572,188 B1
(45) Date of Patent: Aug. 11, 2009

(54) BACKUP MEMORY MANAGING DEVICE BACKUP MEMORY MANAGING METHOD GAME MACHINE AND RECORDED MEDIUM

(75) Inventors: Koji Kaifu, Tokyo (JP); Osamu Nakaie, Warabi (JP); Kouji Tsuchiya, Tokyo (JP)

(73) Assignee: Kabushiki Kaisha Sega Enterprises, Tokyo (JP)

( * ) Notice: Subject to any disclaimer, the term of this patent is extended or adjusted under 35 U.S.C. 154(b) by 0 days.

(21) Appl. No.: 09/623,162

(22) PCT Filed: Dec. 28, 1999

(86) PCT No.: PCT/JP99/07415

§ 371 (c)(1),
(2), (4) Date: Dec. 26, 2000

(87) PCT Pub. No.: WO00/39688

PCT Pub. Date: Jun. 7, 2000

(30) Foreign Application Priority Data

Dec. 28, 1998 (JP) .................. 10-373710

(51) Int. Cl.
*A63F 9/24* (2006.01)
(52) U.S. Cl. .................. 463/43; 463/23
(58) Field of Classification Search ......... 711/161–163, 711/156, 154; 463/43, 44, 29, 47, 23, 24; 273/148 B
See application file for complete search history.

(56) References Cited

U.S. PATENT DOCUMENTS

| | | | | |
|---|---|---|---|---|
| 4,858,930 A | * | 8/1989 | Sato | 463/23 |
| 5,238,250 A | * | 8/1993 | Leung et al. | 463/24 |
| 5,428,767 A | * | 6/1995 | Onishi | 711/105 |
| 5,759,100 A | * | 6/1998 | Nakanishi | 463/37 |
| 5,768,382 A | * | 6/1998 | Schneier et al. | 380/251 |
| 6,007,428 A | * | 12/1999 | Nishiumi et al. | 463/36 |
| 6,132,315 A | * | 10/2000 | Miyamoto et al. | 463/43 |
| 6,220,964 B1 | * | 4/2001 | Miyamoto et al. | 463/43 |
| 6,261,179 B1 | * | 7/2001 | Miyamoto et al. | 463/23 |
| 6,264,558 B1 | * | 7/2001 | Nishiumi et al. | 463/36 |
| 6,324,626 B1 | * | 11/2001 | Uenoyama et al. | 711/163 |

(Continued)

FOREIGN PATENT DOCUMENTS

JP 63-143969 U 9/1988

(Continued)

*Primary Examiner*—Corbett Coburn
*Assistant Examiner*—Omkar Deodhar
(74) *Attorney, Agent, or Firm*—Finnegan, Henderson, Farabow, Garrett & Dunner, L.L.P.

(57) ABSTRACT

The purpose of the present invention is to provide a backup memory management system capable of indicating any misuse of data in a backup memory and imposing an appropriate sanction. The backup memory management device comprises a data saving system 10. When the generated and renewed parameter data is stored into the backup memory 3, the data saving system 10 determines whether or not parameter data already stored in the backup memory 3 is proper data, and if the parameter data is determined as proper data, the generated and renewed parameter data is written over the parameter data saved in the backup memory 3, and if the parameter data is determined as improper data, executes predetermined special processing. Special processing means processing such as imposing a penalty in the course of a game.

9 Claims, 5 Drawing Sheets

U.S. PATENT DOCUMENTS

| | | | |
|---|---|---|---|
| 6,386,979 B1 * | 5/2002 | Ho et al. | 463/43 |
| 6,406,372 B1 * | 6/2002 | Turmell et al. | 463/43 |
| 6,478,679 B1 * | 11/2002 | Himoto et al. | 463/36 |
| 6,488,587 B1 * | 12/2002 | Furuichi et al. | 463/44 |
| 6,561,901 B1 * | 5/2003 | Takase | 463/24 |
| 6,582,311 B1 * | 6/2003 | Sugimura | 463/43 |

FOREIGN PATENT DOCUMENTS

| | | |
|---|---|---|
| JP | 03-238541 | 10/1991 |
| JP | 04-311229 | 11/1992 |
| JP | 04-338823 | 11/1992 |
| JP | 09-028900 | 2/1997 |
| JP | 09-198432 | 7/1997 |
| JP | 10-283262 | 10/1998 |

\* cited by examiner

FIG.5

| FILE MANAGEMENT INFORMATION 41 | | | MAIN FRAME OF PARAMETER DATA 42 | | | | |
|---|---|---|---|---|---|---|---|
| FILE NAME | TIME STAMP | COMMENTS | CHECKSUM | CHARACTER INFORMATION | GROWING PARAMETER | PROCESS FLAG | MANAGEMENT FLAG |
| 411 | 412 | 413 | 421 | 422 | 423 | 424 | 425 |

FIG.6

| FILE MANAGEMENT INFORMATION 41 | | | MAIN FRAME OF PARAMETER DATA 42 | | | | | |
|---|---|---|---|---|---|---|---|---|
| FILE NAME | TIME STAMP | COMMENTS | CHECKSUM | CHARACTER INFORMATION | GROWING PARAMETER | PROCESS FLAG | MANAGEMENT FLAG | PRODUCT ID, etc |
| 411 | 412 | 413 | 421 | 422 | 423 | 424 | 425 | 426 |

BACKUP MEMORY MANAGING DEVICE BACKUP MEMORY MANAGING METHOD GAME MACHINE AND RECORDED MEDIUM

FIELD OF THE INVENTION

The present invention relates to a game device structured such that parameter data can be stored in the course of a game, and particularly to a backup memory management method for preventing an unauthorized exchange of the backup memory and other misuses.

BACKGROUND ART

Some of the conventional TV game devices have a built-in backup memory, and are structured such that the level of progress of the game and the types of the characters (objects indicating characters) can be stored as parameter data in the backup memory. By storing the progress of the game in the backup memory on a regular or a manual basis, the player can restart the game from the state of progress immediately before the power was switched off. Since a backup memory was conventionally built inside a game device, all of the parameter data saved in the backup memory could be managed by the game device and the management procedures were simple.

Furthermore, some of the game devices were structured such that flags indicating prohibition of duplication were added to the parameter data, and overwriting of data was prohibited whenever a flag prohibiting duplication of data was placed.

However, the recent spread of game devices with separable backup memories has caused several inconveniences to the conventional backup memory management.

For example, if a backup memory is structured to allow replacement, a backup memory storing parameter data of a game played halfway by someone else can be applied to a game device. Therefore, even a player playing the game for the first time can use a backup memory stored by others and start a game from halfway. However, game software is manufactured with the purpose of having a single player play the game from the beginning until the end. Nonetheless, if such "bypass" use of game software is possible, this may impair the difficulty of the game, i.e., an important feature of a game.

Similarly, since a backup memory can be replaced even in the process of a game, by replacing a backup memory with another backup memory and overwriting the parameter data, one may duplicate a backup memory which records the progress of the same game. This allows an exchange of backup memories with others, and unauthorized start of a game from halfway may be thereby promoted.

Nevertheless, such problem can not be solved by simply adding the flags for prohibiting duplication of data when saving parameter data and prohibiting overwriting of data whenever these flags are placed, because this creates a different problem. Namely, such a structure forced the players to play the game from the beginning should the parameter data in the backup memory be destroyed by a physical defect, and is therefore considerably disadvantageous for the players.

Accordingly, in view of the aforementioned inconveniences, the inventors of the present invention have devised a memory management technology preferable to a game device having a separable memory. More specifically, the purpose of this invention is to provide a memory management device, a memory management method, a game device, an information processing device, a data storing method and a recording medium, which can detect the duplication of data stored in a separable memory without fail and impose an appropriate sanction.

SUMMARY OF THE INVENTION

The present invention is a memory management device having a memory for archiving and saving data necessary for computer processing, comprising a data saving means which determines, when any generated and renewed data is saved in the memory, whether or not data already stored in the memory is proper data, and if the data is determined as proper data, overwrites the generated and renewed data on the data stored in the memory, and if the data is determined as improper data, executes predetermined special processing.

In the present invention, "memory" particularly means an item structured such that it can be separated by the user, and the backup memory 3 described below falls under this category. "Data" means all information defining the state of software control, regardless of the purpose of its use or its data structure. For example, the parameter data 40, etc. described below falls under this category. "Proper" means that a memory has never exchanged during the computer processing, and that the data was not generated by a method other than the procedures expected by the computer, i.e., the same data being repeatedly overwritten. "Special processing" includes user notification processing or partial data modification processing, etc. Furthermore, it also includes the number of duplications or the number of penalty impositions in a case where such information does not directly affect the computer processing but the data saving history thereof is recorded.

For example, the special processing above is processing for changing specific information of the overwritten data. In computer processing, the special processing and the change in the specific information are performed for executing processing which brings a disadvantage to an operator as compared with a case of proper data use. This means that data can be duplicated but a certain influence is caused, and that such processing is effective for preventing any unauthorized duplication. More specifically, it includes parameter modification for providing a situation as though progress of computer processing has substantially moved backward, the parameter value reduction corresponding to the advantage of the user in the computer processing, or the processing for leaving the state of the user unchanged but bringing an advantage or a disadvantage to the computer of others. Furthermore, the specific information includes the number of duplications and the number of penalty impositions, as well as processing for bringing a disadvantage to a user when such number reaches a certain value.

Here, the aforementioned data saving means comprises an ID information storing area capable of duplicating prescribed ID information included in the data in the memory, an ID information comparing means for reading, before the generated and renewed data is saved in the memory, ID information included in the data already stored in the memory, and comparing the ID information with the ID information stored in the ID information storing area, a determining means for determining whether or not the two types of ID information compared by the ID information comparing means conform with each other, a special processing executing means for executing the special processing when nonconformity of the two types of ID information is determined, a writing means for writing the generated and renewed data into the memory, and an ID information duplicating means for duplicating to the ID information storing area the ID information included in the data written into the memory. For example, the ID information duplicating means duplicates, as the ID information, the time information added to the data by the computer when the data is written in. Moreover, the ID information duplicating means further comprises a data generating means for generating, when the data is generated and updated, individual information of the data, and the ID information duplicating means duplicates the individual information added to the data to be written in. Individual information is, for example, a checksum or personal information of a player stored in an externally-connected memory or a game device. The personal information of a player includes his/her name, birthday, sex, blood type, age, occupation, etc. Furthermore, the ID information can be a combination of multiple types of information. Furthermore, the "ID information" may be a physical bit state of the data itself. In other words, the ID information can show the bit sate of data in whole or in part, or the information volume of data.

The present invention comprises a data generating means for adding to the data an individual device ID of the device, an ID information comparing means for reading, before the generated and renewed data is saved in the memory, the device ID included in the data already stored in the memory, and comparing the device ID with a device ID set in the memory management device, a determining means for determining whether or not the two types of ID information compared by the ID information comparing means conform with each other, a special processing executing means for executing the special processing when nonconformity of the two types of ID information is determined, and a writing means for writing the generated and renewed data into the memory.

"Device ID" here means the individual device information stored somewhere in the device, such as a serial number (production number and lot number) of a product, or a combination of peripherals connected, or serial number of a peripheral, etc. Furthermore, the aforementioned personal information of a player can be used as a "device ID".

It is preferable that once the personal information or individual information is set, a storing method difficult to alter for a third party other than the manufacturer is employed. For example, measures such as using a fresh memory or a one-time ROM or prohibiting access from the application software to the memory are employed.

The present invention is a game device, wherein in special processing, parameters affecting the advantage of a player in the course of a game are changed in a manner to bring a disadvantage to the player. Flags showing the progress of the game, or the like are used as these parameters. For example, in a role-playing game, the special processing can be processing for reducing the amount of the main character's money, decreasing the level of progress in the game, reducing the strength of the main character, forcing implementation of a special penalty game, or influencing the operation of the character for a certain period of time, or the like. Furthermore, in a simulation-type game, the special processing may be processing for prohibiting trade of characters or restricting other acts in a sports game, or processing for causing a disaster in a city construction simulation game. Furthermore, in a sports or racing game where records of the players are recorded, there may be executed processing for imposing a penalty state until the No. 1 record is renewed, or processing for exempting from penalty up to three duplications but imposing a penalty for any further duplications.

The present invention comprises a step for determining, when generated and renewed data is saved in the memory, whether or not data already stored in the memory are proper data, a step for overwriting, if the data is determined as proper data, the generated and renewed data on the data stored in the memory, and a step for executing, if the data is determined as improper data, predetermined special processing.

Here, a step for executing special processing is, in computer processing, preferably processing for bringing a disadvantage to an operator as compared with a case of proper data use.

Furthermore, the present invention is a memory management method for archiving and saving data necessary for computer processing, comprising a step for reading, when the generated and renewed data is saved in the memory, ID information included in the data already stored in the memory, and comparing the ID information with the ID information stored in the ID information storing area, a step for determining whether or not the two types of ID information compared by the ID information comparing means conform with each other, a step for executing, when nonconformity of the two types of ID information is determined, the predetermined special processing, a step for writing the generated and renewed data into the memory, and a step for duplicating to the ID information storing area ID information included in the data written into the memory.

Furthermore, the present invention is an information processing device comprising a main body which includes a controlling device for executing information processing and a memory device used upon execution of the information processing by the controlling device, and a separable memory device separably provided to the main body, storing data used in the controlling device, wherein the main body reads the data stored in the separable memory device and stores it in the memory device, and executes information processing using the data, and after execution of information processing, if the data stored in the separable memory is to be renewed, compares the data stored in the separable memory device with data prior to information processing, stored in the memory of the main body, and when they conform, renews the data stored in the separable memory device.

Furthermore, the present invention is a data storing method for storing data in a separable memory device separably provided to a main body including a controlling device which executes information processing and a memory device used upon execution of the information processing by the controlling device, comprising a step for reading the data and the data stored in the separable memory device, and storing them in the memory device, a step for executing information processing using the data, a step for comparing the data stored in the separable memory device with the data prior to information processing, stored in the memory of the main body, and a step for renewing, when conformity is determined, the data stored in the separable memory device.

Furthermore, the present invention is a machine-readable storing medium wherein a program capable of executing the memory management method and data storing method above is stored in a computer device. "Recording medium" here means an item with information (mainly digital data, program) recorded therein by a certain physical means, which allows the execution of a prescribed function by a processing device such as computer, dedicated processor, etc. In short, any item is possible as long as the program is downloaded to a computer by a certain means and a prescribed function is executed. The recording medium includes, for example, a flexible disk, fixed disk, magnetic tape, optical magnetic disk, CD, CD-ROM, CD-R, DVD-RAM, DVD-ROM, DVD-R, PD, MD, DCC, ROM cartridge, RAM memory cartridge with a battery backup, flash memory cartridge, non-volatile RAM cartridge, etc. Transfer of data from the host computer via a wire or wireless communication line (public line, data dedicated line, satellite line, etc.) is also included therein. Furthermore, the so-called "Internet" is also included in the recording medium.

BRIEF DESCRIPTION OF THE DRAWINGS

FIG. 5 is a diagram showing the data structure of parameter data according to an embodiment.

FIG. 6 is a modified example of a diagram showing a data structure of parameter data according to an embodiment.

BEST MODES FOR CARRYING OUT THE INVENTION

Now, an embodiment of the present invention will be explained with reference to the figures.

(Structure)

Figure 1:
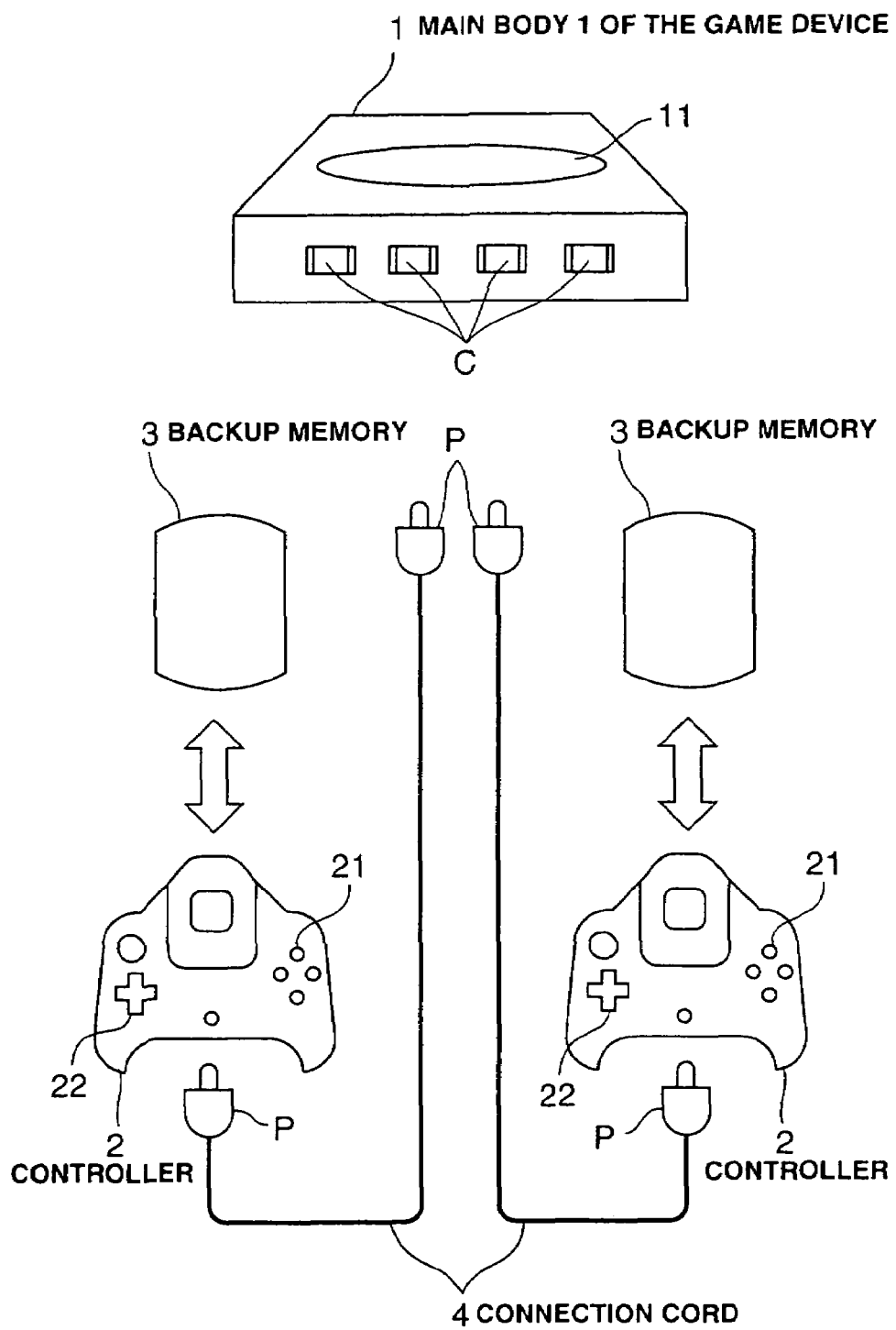
FIG. 1 is a conceptual diagram showing the connections in a game device according to an embodiment.

FIG. 1 is a conceptual diagram showing the connections in a game device according to the present embodiment. As shown in FIG. 1, the game device is structured such that a main body 1 of the game device, a controller 2 and sub unit 3 are connected to one another.

The main body 1 is a main body of a controlling unit which controls the progress of a game. In the main body 1, a plurality of controllers 2 can be connected via a connector C. Furthermore, a main body 1 separably comprises a CD-ROM driver 11 for CD-ROMs and other recording media.

The controller 2 is structured as an operating portion operated by the respective players, and has a group of operational buttons 21 and a cross key 22 etc., and can be connected to the main body 1 via a connection cord 4 having a connector P. The controller 2 particularly includes a memory 3 in a separable manner.

Figure 2:
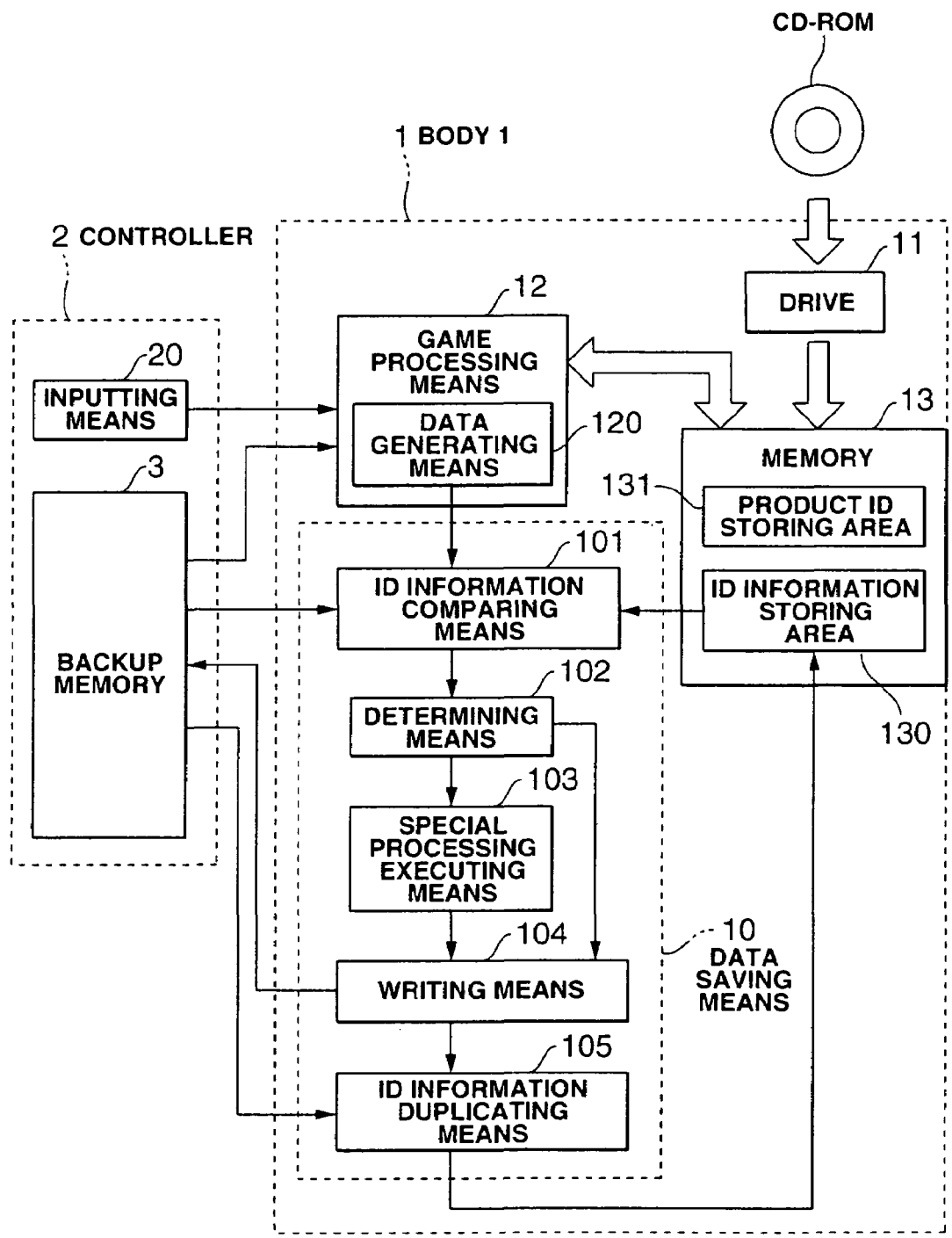
FIG. 2 is a block diagram showing the functions of a game device according to an embodiment.

FIG. 2 is a block diagram showing the functions of the game device. The controller 2 has an operating portion 20 for receiving an operation status from the operational buttons 21 and the cross key 22, converts them into operating signals on a regular basis, and thereafter transmits these signals to the main body 1. The operating signals from each controller 2 are used for moving characters displayed in the game. The backup memory 3 can be applied to the controller 2 in a separable manner, and has a non-volatile memory built therein. Furthermore, the backup memory 3 is capable of writing to the game device any data parameters including the state of progress, game results, method of operation and other settings generated in the course of a game, sent from the main body 1 of the game device, or reading any parameter data stored and transmitting it to the main body 1. The parameter data is managed by the backup memory management method of the present invention and serves as backup data when the power is shut down, in order to allow restart of the game from the state immediately before the power shutdown.

The main body 1 has a data saving means 10, the CD-ROM drive 11, a game processing means 12 and a memory 13. The CD-ROM drive 11 controlled by a CPU (not shown) is capable of reading a program for an operating system from a CD-ROM applied thereto, as well as a backup memory management program and a game processing program according to the present invention, and transferring these programs to a memory 13. The memory 13 structured by a RAM, etc. is assigned a working area in the CPU for storing programs transferred from the CD-ROM. The memory 13 particularly has an ID information storing area 130 and a product ID storing area 131, and is capable of storing ID information according to the present invention.

Figure 3:
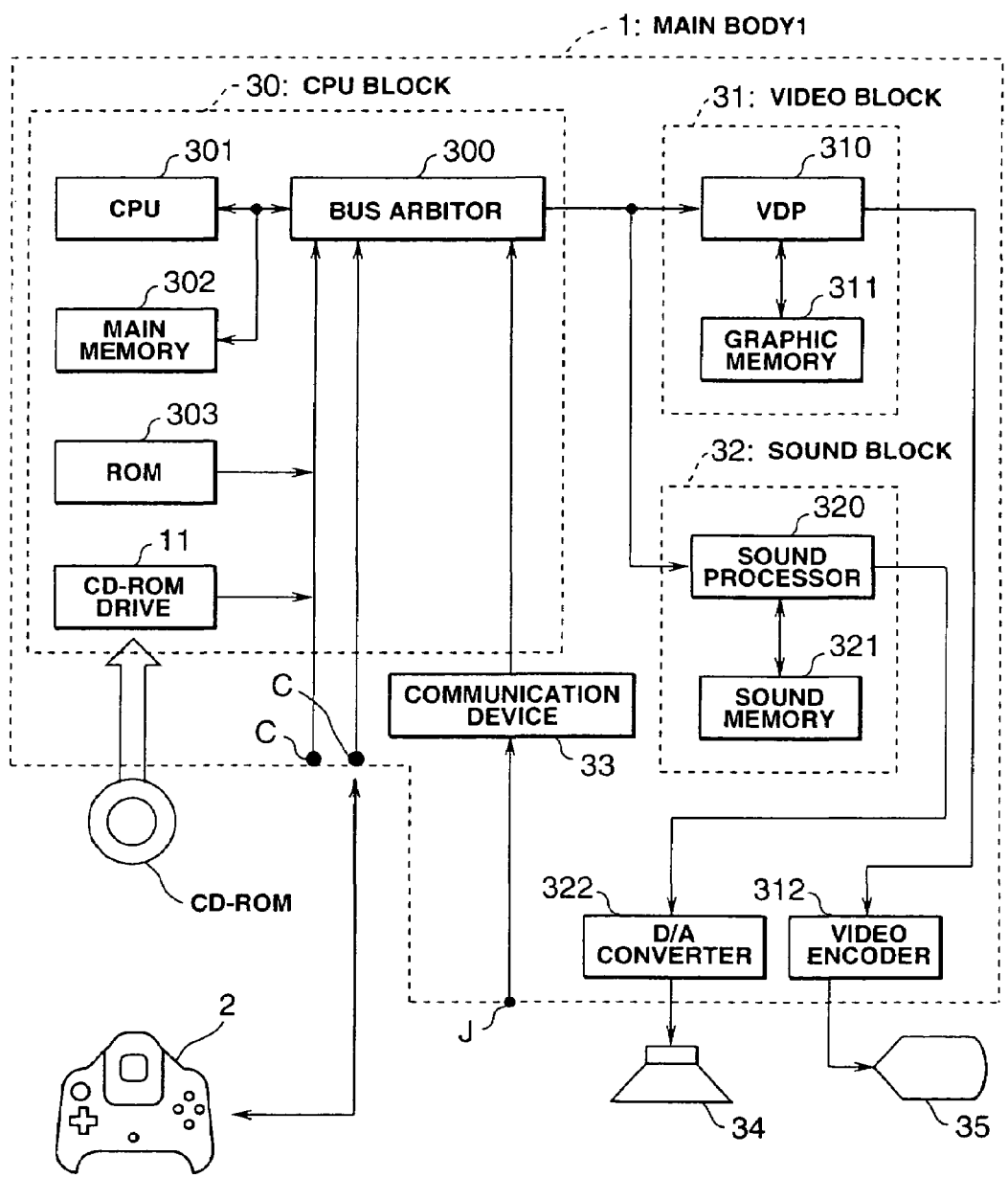
FIG. 3 is a block diagram showing the hardware of a game device according to an embodiment.

The game processing means 12 is functionally accomplished through a game processing program executed by a computer device comprising a CPU (see FIG. 3). More specifically, the game processing means 12 executes an initial execution program and initializes the entire device when the power is switched on. When application of a CD-ROM to the CD-ROM drive 11 is detected, the operating system processing data stored in the CD-ROM is transferred to the memory 13, and the game processing means 12 subsequently executes actions pursuant to the operating system. Furthermore, a program for a data saving method program and a program for a game processing method according to the present invention which are stored in the CD-ROM are transmitted to the memory 13 and subsequently executed (explained below with reference to FIG. 3). Regarding the content of the game processing, the processing means applied to a conventional game device is executed. Namely, on the basis of operational signals transmitted from the inputting means 20, positions of characters and objects displayed in the game screen are determined for each frame period by the game processing means 12. Furthermore, picture data for displaying objects at determined positions and the corresponding sound data is transmitted to a video display block and an audio block (not shown), whereby frame pictures are displayed and sound data is output.

The game processing means 12 particularly has a data generating means 120. If a player operates the inputting means 20 and makes a request for saving data at the time of the game processing, the data generating means 120 generates the aforementioned parameter data which indicates the current progress of the game and character settings. Upon such occasion, the data generating means 12 may, if necessary, generate individual information (checksum) for the backup memory management according to the present invention in order to use such information as ID information for determining the properness of the data.

Together with the game processing means 12, the data saving means 10 is functionally accomplished by a computer device including a CPU which executes a program for implementing the backup memory management method according to the present invention. Upon saving any generated or renewed parameter data to the aforementioned backup memory, the data saving means 10, together with the game processing means 12, generally determines whether or not the parameter data already stored in the backup memory is proper data. If the parameter data is determined as proper data, the game processing means 12 overwrites the generated or renewed parameter on the parameter data stored in the backup memory, and if the parameter data is not determined as proper data, the game processing means 12 executes predetermined special processing.

More specifically, the data saving means 10 has an ID information comparing means 101, a determining means 102, a special processing executing means 103, a writing means 104, and an ID information duplicating means 105. When any parameter data generated or renewed by the data generating means 10 is saved in the backup memory 3, the ID information comparing means reads ID information in parameter data already stored in the backup memory 3 and compares such information with the ID information duplicated in the aforementioned ID information storing area. One type of ID information is the time information which is added to the parameter data when it is written into a computer device. Furthermore, in the present embodiment, individual information added by the data generating means 120 is used together with the time information. The determining means 102 determines whether or not the two types of ID information compared by the ID information comparing means 101 conform with each other. If the determining means 102 determines that the two types of ID information do not conform, the special processing executing means 103 executes special processing. Special processing here means to impose a penalty in the course of a game. The writing means 104 can write any generated and renewed parameter data to the backup memory 3. The ID information duplicating means 105 can duplicate to the ID information storing area 130 of the memory 13 any ID information included in the parameter data written into the backup memory 3.

(Hardware Structure)

Functional blocks shown in FIG. 2 are accomplished through the execution of a program by hardware shown in FIG. 3. FIG. 3 is a block diagram showing the hardware of the present game device. The main body 1 of the game device has a structure similar to the computer device, and includes a CPU block 30, a video block 31, a sound block 32, and a communication device 33.

The CPU block 10 has a bus arbiter 300, a CPU 301, a main memory 13, a ROM 303, and a CD-ROM 11. The bus arbiter 300 is structured such that transmission and reception of data may be controlled by assigning bus occupation time to devices which are mutually connected via the bus. The CPU 301 is structured such that it has access to the main memory 13, the ROM 303, the CD-ROM 11, the video block 31, the sound block 32, and the controller 2. The CPU 301 is in charge of the processing of the data saving means 10 and the game processing means 12. For executing the game processing, the CPU 301 can transfer the game processing picture data to the graphic memory 311 and transfer sound data to the sound memory 321. The ROM 303 constitutes a storing area for an initial program loader. Although the CD-ROM drive 11 uses CD-ROMs as a recording medium, there is no limitation to the recording media and other various recording media can also be read. Furthermore, programs according to the present invention can be transferred via the communication device 33. Such a setting allows transfer of data from a fixed disk of a remote server.

The video block 31 has a VDP (Video Display Processor) 311, a graphic memory 311 and a video encoder 312. Such a structure allows the video block 31 to form 3D picture data. The video encoder 312 is structured such that picture data generated by the VDP 310 is converted to NTSC-mode signals and other prescribed TV signals and output to an externally connected main monitor 35 (a cathode ray tube, etc. of a TV receiver).

The sound block 32 has a sound processor 320, a sound memory 321 and a D/A converter 322. Such a structure allows the sound block 32 to implement voice synthesis according to waveform data and to output acoustic signals. The D/A converter 322 is structured such that the sound data generated by the sound processor 320 is converted to analog signals and output to an externally connected speaker 34 (a speaker of a TV receiver or a speaker of an audio device).

The communication device 33 may be, for example, a modem or a terminal adapter, and is structured such that it may be connected to the game device 1 and function as an adapter which connects the main body 1 of the game device to an external line. The communication device 33 can receive data which is transmitted from internet servers and other game supplying servers connected to a public network and supply such data to a bus of the CPU block 30. The public network can be a subscriber's loop, dedicated line, wire or wireless.

(Parameter Data Structure)

FIG. 5 shows the parameter data structure used in the present embodiment. A parameter data 40 according to the present embodiment is structured by adding a file management information portion 41 to the front portion of a parameter data frame 42. The file management information portion 41 is structured by a file name 411, a time stamp 412, and comments 413. The file name 411 constitutes a file name, by which the operating system determines and manages the parameter data as a file. The time stamp 412 is used as a part of the ID information according to the present invention, and is data which shows the saving time of a file generated and saved by the operating system at the time a file is stored. The comments 413 are data which is used by the data processing means for such parameter data.

The parameter data frame 42 is structured by a checksum 421, character information 422, a growing parameter 423, a progress flag 424, a management flag 425, etc. The checksum 421, together with the time stamp 412, constitutes the ID information of the present invention, and is also a checksum calculated for the entire data. The character information 422 is an area for storing characters related to parameters. The growing parameter 423 constitutes information relating to the advantages of a player, which changes along with the game processing. The progress flag 424 constitutes information showing the progress of the game, which changes according to the level of progress in a game. The management flag 425 constitutes information which includes a penalty flag showing the content of a penalty imposed in relation to saving parameter data or a number flag showing how many times the data was duplicated. The growing parameter 423, the progress flag 424, and the management flag 425 constitute specific information of the present invention, relating to the advantage of a player, which is changed into a penalty by the special processing of the present invention. These parameter data structures are indicated as an example, and can be modified in various ways according to the content of the game processing. Furthermore, in the parameter data structure, the item used as ID information and the item changed as special information can be freely decided.

(Explanation of Actions)

Figure 4:
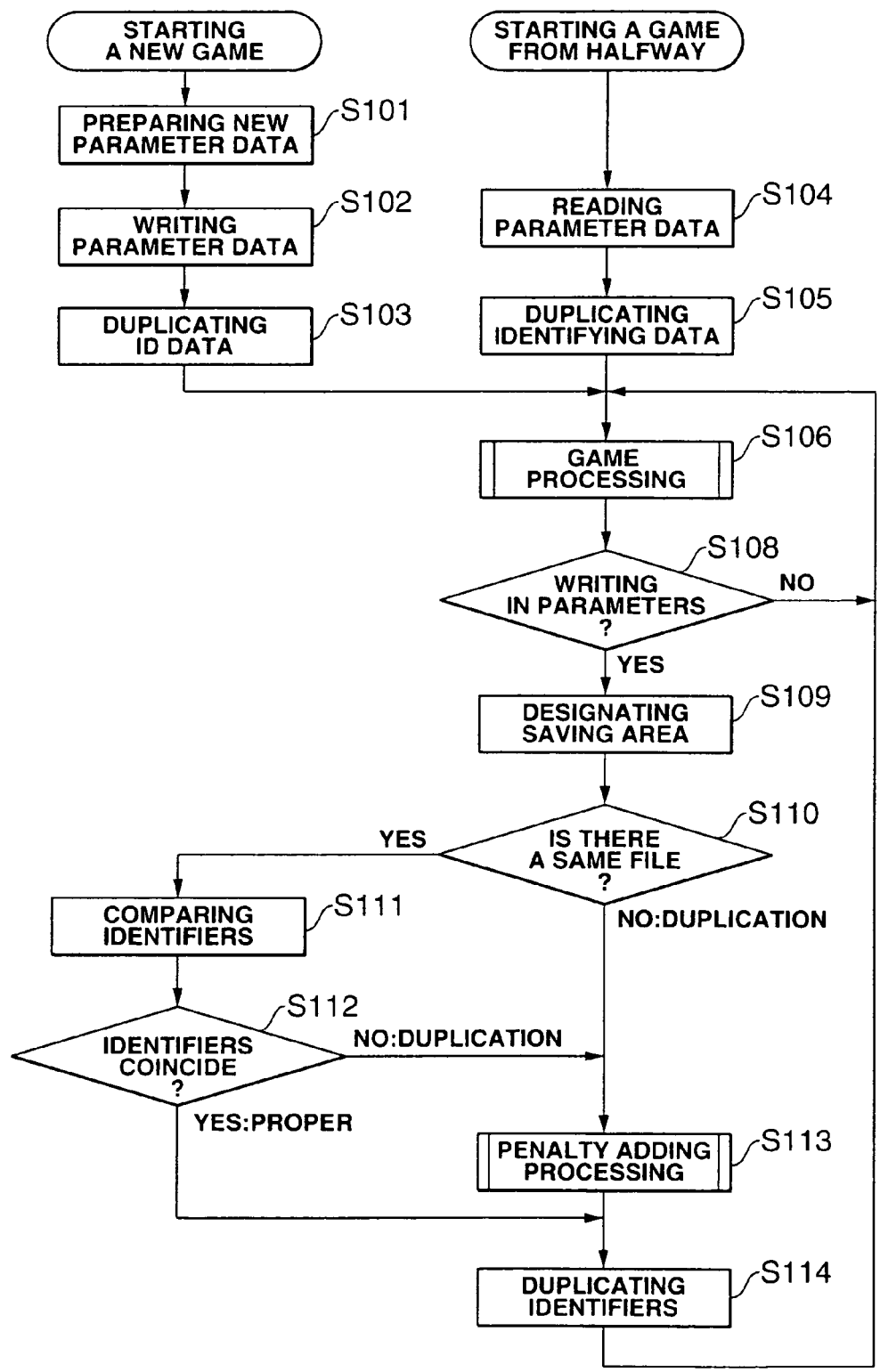
FIG. 4 is a flowchart explaining the backup management actions performed by the main body of a game device.

Now the backup memory management actions will be explained below with reference to FIG. 4.

Starting a new game means that the user plays the game for the first time after obtaining the CD-ROM of the TV game. When the user performs a directive operation for saving the progress of a game still in progress via the controller 2, a parameter data showing the progress of the game at a designated time is generated by the data generating means 120 (S101). At the same time, the checksum 421 is also generated according to the content of the data. This parameter data is stored to the backup memory 3 for the first time, and in the backup memory there is no file having the same file name as the parameter data to be saved. Therefore, the writing means 104 simply stores the parameter data to the backup memory 3 (S102). The time stamp 412 and the checksum 421 in the parameter data saved are duplicated from the file management portion 41 of the saved parameter data to the ID information storing area 130 by the ID information duplicating means 105 (S103).

Starting a game from halfway means to restart a game using the parameter data which this user has saved for such TV game. When the user directs restart of the game, the game processing means 12 reads the parameter data from the backup memory 3 (S104). The time stamp 412 and the checksum 421 in the saved parameter data are duplicated from the file management portion 41 of the read out parameter data to the ID information storing area 130 by the ID information duplicating means 105 (S105).

After archiving and saving ID information in the ID information storing area 130 by any of the aforementioned processing, the game processing program is executed by the game processing means 12 (S106). The player operates the controller 2 and the game progresses. In the meantime, the growing parameter 423 changes depending on how unskillfully the player performs operation for an attack, and the progress flag 424 changes along with the progress of the game. Unless the parameter data saving processing is executed (S108; NO), the game device continues its game processing (S106).

If the parameter data saving processing is directed by a direction from the user or the automatic processing during the game (S108; YES), the game processing means 12 provides a display for enabling the user to designate a storing area, and accepts the storing area designated by the user (S109). As a consequence, the controller 2 for storing the parameter data in the backup memory 3 is determined.

The ID information comparing means 101 searches the designated backup memory 3, and checks whether or not there exists a file with the same name as the prescribed file name of the parameter data (S110). In the case of proper use, i.e., if the game processing is executed without the backup memory being exchanged, a file should be created in the backup memory without fail under the same file name through processing S102 and S104. Accordingly, if no file exists under the same name (S110; NO), the determining means 101 determines that duplication has taken place. Subsequently, the special processing executing means 103 executes penalty adding processing (S113). In other words, with respect to the parameter data to be saved, the special processing executing means 103 either sets the growing parameter 423 at a lower value, or sets the progress flag 424 at a value as though the progress of the game has moved backward. Furthermore, the management flag 425 is recorded after increasing the number of parameter data duplications by one or after increasing the number of penalty impositions by one.

Furthermore, if the setting is such that a penalty is imposed only after parameter data is copied a certain number of times, when the number of duplications is increased by one, determination is made as to whether or not there has been a prescribed number of duplications (for example, three times), and in the event of such prescribed number of duplications, penalty processing for changing the growing parameter and the progress flags are executed.

Moreover, if there exists a file with the same name as a predetermined file name in the backup memory 3 (S110; YES), it means that the parameter data has been stored as a matter of form. However, even if there exists a file with the same name, it is possible that duplication has been made through an unauthorized exchange of the backup memory, etc. Therefore, the ID information comparing means 101 reads ID information from the parameter data saved in the backup memory 3 for comparing it with the ID information archived in the ID information storing area at steps S103 and S105 (S111). The time stamp 412 and the checksum 421 are used together as ID information.

If, as a result of the comparison, both the timestamp and the checksum are found to conform (S112; YES), the determining means 102 determines an authorized backup and directs the writing means 104 to overwrite the parameter data. However, if either the timestamp or the checksum does not conform (S112; NO), the determining means 102 determines duplication, and makes the special processing means 103 execute the penalty adding processing as described above (S113).

Here, both the timestamp and the checksum are compared because in some cases duplication may not be determined by comparing only either of the two. Furthermore, although a timestamp is added by the operating system in a uniform manner, by setting a clock of the game device the same as the timestamp in the ID information stored in the ID information storing area 130, multiple files can be prepared with the same time stamp. This is because, although the checksum is added according to the logical computation of the entire data, different data can sometimes have the same checksum in the logical computation.

Thus, upon duplication, a penalty is added to cause a change, while upon proper use, whenever parameter data is saved without any penalty, the ID information duplicating means 5 reads the timestamp 412 of the parameter data saved for that segment and stores it together with the checksum 421 to the ID information storing means 130 as new ID information (S114). By the processing above, parameter data saving processing at one given time is completed. The processing above (S106 through S114) is thereafter repeated every time the parameter data is saved.

(Advantages)

Thus the present embodiment has the following advantages:

1) According to the present embodiment, whenever duplication of parameter data in a backup memory is determined, parameters can be changed for bringing a certain disadvantage to a player, whereby a proper sanction is applied in the event of an unauthorized duplication, etc. in the backup memory and such unauthorized act is prevented.

2) However, according to this embodiment, although special processing is executed, this does not prohibit the duplication itself and there is no need to prohibit duplication of parameter data which is made against any actual destruction of data.

3) According to the present invention, since ID information of parameter data in the backup memory is once archived, and ID information of parameter data is read when being restored for mutual comparison, exchange of a separable backup memory and other unauthorized acts can be detected without fail.

4) In particular, according to the present embodiment, since two types of ID information, i.e., timestamps and checksums are used together, any unauthorized operation performed by changing the time of the clock can be detected without fail.

5) Furthermore, according to the present embodiment, since the number of duplications and the number of penalty impositions can be recorded in the management flags, it is possible to change the design so that penalties are imposed after a certain number of duplications. This allows a one-time update of data performed for the original purpose, without causing any disadvantage to the player. Furthermore, by determining the number of penalty impositions, a stricter sanction can be imposed to a frequently duplicating user according to the level of his/her unauthorized act.

OTHER MODIFIED EXAMPLES

The present invention can be modified without being restricted to the embodiment described above. For example, ID information is not restricted to the timestamps and checksums used in the present embodiment.

For example, as shown in FIG. 6, the ID 426 can be structured so that the parameter data 40 is added thereto. Given such structure, the data saving means executes processing so that, when the parameter data is read or written, product IDs are saved in the product ID storing area 131 in the same manner as in the case of the aforementioned ID information. Furthermore, when the ID information is compared at step S 111, the product IDs are also compared as one of the ID information. Product IDs and other ID information can be saved so that data saving means are executed should the backup memory be exchanged. Moreover, instead of a product ID, the personal information of the player can be registered as individual information.

Furthermore, besides the information which is added particularly for preventing duplication, ID information shall mean all such information as is defined exclusively for certain data as a result of addition, modification or deletion of information that is applied to the data by the normal processing or saving processing by an operating system. For example, the physical bit state of data may constitute such information. In other words, the ID information can show the data bit state of the data in whole or in part, or its information volume. ID information used may be determined according to the volume and property of the parameter data.

Furthermore, the aforementioned processing includes all changes that are made for executing notification processing for drawing the attention of the player by stimulating the respective senses (visual sense, auditory sense, tactile sense, olfaction, etc.) of the player, or for executing, in the course of computer processing, processing which brings a disadvantage to the operator as compared with a case of normal use of the parameter data. For example, in a role-playing game, there may be executed processing for reducing the amount of the main character's money, lowering the level of progress in the game, reducing the strength of the main character, forcing implementation of a special penalty game, influencing the operation of the character for a certain period of time, or the like. Furthermore, in a simulation-type game, there may be executed processing for prohibiting trade of characters or restricting other acts in a sports game, or processing for causing disaster in a city construction simulation game. Furthermore, in a sports or racing game where scores of players are recorded, there may be executed processing for imposing a penalty state until the No. 1 record is renewed, or processing for exempting from penalty up to three duplications but imposing a penalty for any further duplications.

INDUSTRIAL APPLICABILITY

According to the present invention, since duplication of data in the memory can be detected and prescribed processing is executed when duplication is determined, provided are a backup memory management device, a backup memory management method, a game device, information processing device, data storing device and a recording medium which can detect an exchange of a separable backup memory and other unauthorized acts without fail. Furthermore, according to the present invention, since ID information of data in the memory is once archived and ID information of parameter data is reread when resaved and mutually compared, provided are a backup memory management device, a backup memory management method, a game device, information processing device, data storing device and a recording medium which can detect an exchange of a separable backup memory and other unauthorized acts without fail.

The invention claimed is:

1. A game management method executable with respect to a game operable by a player on a game device, which is configured to have device ID information unique to said game device, and which is provided with interface means to which a memory medium is removably mounted, said method comprising the steps of:
   (a) storing a memory medium mounted to the interface means of the game device with said device ID information, parameter data indicative of an intermediate stage of the progress of the game performed by the player on the game device, and data ID information configured with respect to the parameter data at the time when the player stops the game at the intermediate stage;
   (b) duplicating the data ID information and parameter data stored in the memory medium into a storing area in said game device when the memory medium is mounted to the interface means so that a copy of the data ID information is stored in the storing area while the same data ID information is retained in the memory medium;
   (c) allowing the game to restart on the game device from the intermediate stage taking advantage of utilizing the parameter data read from the memory medium mounted to the game device when the device ID information stored in the memory medium is identical to the device ID information which is configured to the game device;
   (d) comparing, in response to operation by the player to stop the progress of the game, the data ID information stored in said memory medium with the data ID information stored in said storing area duplicated from the memory medium at step (b);
   (e-1) overwriting, if the data ID information stored in said memory medium is determined to be identical to the data ID information duplicated in said storing area at step (b), the parameter data on the memory medium with the parameter data renewed by execution of the game on the game device at step (c), the parameter data renewed at step (c) being indicative of a new stage of game processing; or
   (e-2) allowing a memory medium to store parameter data generated by execution of the game on the game device at step (c) but with specific information when either of the device ID information unique to said game device and said data ID information as duplicated in said storing area at said step (b) is not found in the memory medium; and
   (f) allowing the game device to execute the game but with effecting a disadvantage or a penalty against the progress of the game if the game is started while the memory medium containing the specific information stored at the step (e-2) is mounted.

2. The management method according to claim 1, wherein the specific information includes a number of duplications.

3. The management method according to claim 1, wherein step (e-1) further stores time information in said memory medium.

4. A game management method executable with respect to a game operable by a player on a game device which is configured to have device ID information unique to said same device, and which is provided with interface means to which a memory medium is removably mounted, said method comprising the steps of:

(a) storing a memory medium mounted to the interface means of the game device with said device ID information, game data indicative of an intermediate stage of the progress of the game performed by the player on the game device, and data ID information configured with respect to the game data at the time when the player stops the game at the intermediate stage:

(b) determining if a memory medium has is stored with the game data, the data ID information and the device ID information when the memory medium is mounted to the interface means;

(c) duplicating the game data and the data ID information from the memory medium into a storing area on the game device so that a copy of the data ID information is stored in the storing area while the same data ID information is retained in the memory medium;

(d) allowing the game to restart on the game device from the intermediate stage taking advantage of utilizing the game data read from the memory medium mounted to the game device when said device ID information stored in the memory medium is identical to the device ID information which is configured to the game device;

(e) comparing, in response to operation by the player to stop the progress of the game, said data ID information stored in said memory medium with the data ID information duplicated from the memory medium in said storing area;

(f-1) overwriting the game data in the memory medium with the game data renewed by execution of the same on the game device at step (d), if the data ID information stored in said memory medium is determined to be identical to the data ID information duplicated in said storing area at step (b); or (f-2) allowing a memory medium to store the game data generated by execution of the game on the game device at step (d) but with specific information when either of the device ID information unique to said game device and said data ID information as duplicated in said storing area at step (c) is not found in the memory medium; and (g) allowing the game device to execute the game but with effecting a disadvantage or a penalty against the progress of the game if the same is started while the memory medium containing the specific information stored at the step (f-2) is mounted.

5. The game management method according to claim 4, wherein the specific information includes a number of duplications.

6. The game management method according to claim 4, wherein step (e) further stores time information in said memory medium.

7. A game management method executable with respect to a game operable by a player on a game device which is configured to have device ID information unique to said game device and which is provided with an interface means to which a removable storage medium is removably mounted, said method comprising the steps of:

(a) storing a memory medium mounted to the interface means with said device ID information, parameter data indicative of an intermediate stage of the progress of the game performed by the player on the game device, and data ID information configured in relation to the parameter data at the time when the player stops the game at the intermediate stage;

(b) duplicating the data ID information and parameter data stored in said storage medium into a storing area in said game device when the removable storage medium is mounted to the interface means so that a copy of the data ID information is stored in the storing area while the same data ID information is retained in the memory medium;

(c) allowing the game to start on the game device from the intermediate stage taking advantage of utilizing the parameter data read from the storage medium mounted to the game device when the device ID information stored in the memory medium is identical to the device ID information which is configured to the game device;

(d) comparing, in response to operation by the player to stop the progress of the game, said data ID information stored in said storage medium with the data ID information in said storing area duplicated from the storage medium at the step (b); and (e) overwriting the parameter data on said storage medium with parameter data renewed by execution of the game on the game device at step (c) as parameter data indicative of a new stage of the progress of the game when, at the step) (d) the data ID information stored in said storage medium is found identical to the data ID information duplicated in said storing area at step (b).

8. A game management method according to claim 7, wherein the parameter data itself is configured as the data ID information, wherein, at the step (b), the parameter data is duplicated from the storage medium into the storing area as the data ID information, wherein, at step (d), the parameter data stored in the storage medium is compared with the parameter data stored in the storage area on the game device as duplicated in advance from the storage medium at the step (b), and wherein, at step (e), the parameter data stored in the storage medium is overwritten by new parameter data renewed by execution of the game on the game device at step (c) when at the step (d) the parameter data stored in the storage medium is found identical to the parameter data stored in the storage area on the game device.

9. A game management program executable with respect to a game operable by a player on a game device which is configured to have device ID information unique to said game device and which is provided with interface means to which a storage medium is removably mounted, said program, when executed on the game device, performing steps comprising:

(a) storing a memory medium mounted to the interface means with said device ID information, game data indicative of an intermediate stage of the progress of the game performed by the player on the game device, and data ID information configured in relation to the game data at the time when the player stops the game at the intermediate stage;

(b) determining if the storage medium stores the game data, the data ID information and the device ID information when a removable storage medium is mounted to the interface means;

(c) copying the game data and the data ID information from the storage medium into a storing area on the game device so that a copy of the data ID information is stored in the storing area while the same data ID information is retained in the memory medium;

(d) allowing the game to restart on the game device from the intermediate stage taking advantage of utilizing the game data read from the storage medium mounted to the game device;

(e) comparing, in response to operation by the player to stop the progress of the game, said data ID information stored in said storage medium with the data ID information copied in said storing area in advance at step (c); and (f) overwriting the game data on the storage medium with the game data renewed by execution of the game on the game device at step (d), if, at step (e), the data ID information in said storage medium is identical to the ID information copied in said storing area from the storage medium in advance at the step (c).

\* \* \* \* \*

UNITED STATES PATENT AND TRADEMARK OFFICE
CERTIFICATE OF CORRECTION

PATENT NO. : 7,572,188 B1
APPLICATION NO. : 09/623162
DATED : August 11, 2009
INVENTOR(S) : Koji Kaifu et al.

It is certified that error appears in the above-identified patent and that said Letters Patent is hereby corrected as shown below:

On the Title page, item (54), in the Title,

"BACKUP MEMORY MANAGING DEVICE BACKUP MEMORY MANAGING METHOD GAME MACHINE AND RECORDED MEDIUM"

should read --BACKUP MEMORY MANAGING DEVICE, BACKUP MEMORY MANAGING METHOD, GAME MACHINE, AND RECORDED MEDIUM--.

Signed and Sealed this

Twenty-sixth Day of January, 2010

David J. Kappos
*Director of the United States Patent and Trademark Office*

UNITED STATES PATENT AND TRADEMARK OFFICE
CERTIFICATE OF CORRECTION

PATENT NO. : 7,572,188 B1  Page 1 of 1
APPLICATION NO. : 09/623162
DATED : August 11, 2009
INVENTOR(S) : Koji Kaifu et al.

It is certified that error appears in the above-identified patent and that said Letters Patent is hereby corrected as shown below:

On the Title page, item (54) and at Column 1, lines 1-3, in the Title,

"BACKUP MEMORY MANAGING DEVICE BACKUP MEMORY MANAGING METHOD GAME MACHINE AND RECORDED MEDIUM"

should read --BACKUP MEMORY MANAGING DEVICE, BACKUP MEMORY MANAGING METHOD, GAME MACHINE, AND RECORDED MEDIUM--.

This certificate supersedes the Certificate of Correction issued January 26, 2010.

Signed and Sealed this

Sixteenth Day of February, 2010

David J. Kappos
*Director of the United States Patent and Trademark Office*